United States Patent
Delgendre et al.

[19]

[11] 3,847,547
[45] Nov. 12, 1974

[54] PROCESS AND APPARATUS FOR DETECTING OF THE PRESENCE OF A LIQUID

[75] Inventors: Jacques Claude Delgendre, Toulon; Alain Rogar Kerrenneur, Paris; Georges Albert Berton, Toulon, all of France

[73] Assignee: Etat Francais, Armies, France

[22] Filed: Nov. 24, 1972

[21] Appl. No.: 309,596

[52] U.S. Cl............ 23/230 L, 23/230 R, 23/253 R, 200/61.04, 337/300, 344/235, 344/236, 344/244 R, 344/244 C
[51] Int. Cl...................... G01n 31/00, G01n 33/18
[58] Field of Search...... 23/230 L, 253 R, 281, 282, 23/230 R; 337/300; 200/61.04, 61.05; 340/244 C, 244 R, 235, 236; 102/28 R; 252/408

[56] References Cited
UNITED STATES PATENTS
| | | | |
|---|---|---|---|
| 1,825,896 | 10/1931 | Bond | 23/230 R |
| 1,976,752 | 10/1934 | Stanworth | 23/253 R |
| 2,725,821 | 12/1955 | Coleman | 102/28 X |
| 3,764,269 | 10/1973 | Oldham et al. | 23/230 R X |

FOREIGN PATENTS OR APPLICATIONS
| | | | |
|---|---|---|---|
| 575,612 | 2/1946 | Great Britain | 23/253 TP |

Primary Examiner—Joseph Scovronek
Assistant Examiner—Arnold Turk
Attorney, Agent, or Firm—Waters, Roditi, Schwartz & Nissen

[57] ABSTRACT

For the prompt detection of the presence of a liquid there is employed two constituents constituting a pyrotechnical substance, these constituents undergoing a rapid reaction due to the presence of the liquid, the reaction itself being initiated by the thermal effect of reaction of one constituent with the liquid. By way of example, silver difluoride can react rapidly with boron when initiated by the exothermal hydrolysis of silver difluoride. The reaction of the constituents of the pyrotechnical substance can be utilized to influence a circuit so as to open or close the same to indicate the presence of the liquid to be detected.

8 Claims, 3 Drawing Figures

PATENTED NOV 12 1974

3,847,547

PROCESS AND APPARATUS FOR DETECTING OF THE PRESENCE OF A LIQUID

BACKGROUND a. Field of the Invention

This invention relates to a process and device for the prompt detection of the presence of a liquid.

b. Prior Art

The problem of the detection of a liquid is generally solved by means of a sensitive element formed by a mechanical device, such as a float, or by an optical or electrical device. In the latter case, the liquid has to be a conductor of electricity. These devices present common drawbacks to different degrees, namely, as to size, the substantial modifications necessary to the enclosure in which it is required to detect the presence of the liquid and their limited reliability. Most of them require a relatively large minimum quantity of liquid in order to function.

SUMMARY OF THE INVENTION

This invention seeks to provide a method and device for detecting the presence of a liquid which overcomes the disadvantages associated with the prior art.

The invention contemplates a process for the prompt detection of the presence of a liquid, characterized in that it uses the effects of a fast reaction (B) between two bodies forming a pyrotechnical composition, this reaction (B) being initiated by the thermal effects of a reaction (A) of at least one of the said bodies with the liquid to be detected.

The invention also contemplates a process such as that described above and characterized, in addition, by the fact that reaction (B) produces an electrically conducting deposit in the zone situated between two electrodes forming the terminals of an electric circuit, the result of which is to close said circuit.

The pyrotechnical composition may contain at least one metallic salt and, according to another aspect of the invention, the above process is applied to the detection of the presence of water: in this case the pyrotechnical composition essentially contains silver difluoride and the reaction (B) is that of the silver difluoride with boron, thus leading to the formation of a silver deposit and the release of boron trifluoride.

The invention also contemplates a process in which the thermal effect of reaction (B) causes the melting of at least one fusible conducting wire which is part of an electrical circuit, such that the products of the reaction are electrical insulators, thus causing opening of said circuit.

In addition, the invention contemplates a process such as that described above, characterized by the fact that the reaction (A) of a body of a first pyrotechnical composition reacting in the presence of the liquid to be detected initiates reaction (B), the latter causing by chain effect the initiation of at least one other fast reaction (B') between two bodies of another pyrotechnical composition which is different from the first composition.

A further aspect of the invention is directed to a device for effecting the process described above, characterized by comprising:

a medium reacting to the presence of the liquid to be detected, said medium being formed of a pyrotechnical composition, a hollow body containing said medium, and having a first insulating wall in which are fitted at least two electrically conducting elements and a second wall formed by a membrane which is soluble in the liquid to be detected or permeable to it.

In one particular embodiment, the above device is used for the detection of the presence of water, and is characterized in that the pyrotechnical composition consists essentially of silver difluoride and boron, the said composition producing, by reaction, a silver deposit in the zone situated between two electrodes of an electrical circuit, fixed in the insulating wall of the said device and thus causing the closure of said circuit.

The above device preferably may be fixed to an enclosure in which the presence of liquid is to be detected and comprises:

a hollow cylindrical body containing a pyrotechnical composition reacting in the presence of the liquid to be detected, an insulating diaphragm forming one base of the cylinder, in which two electrodes of an electrical circuit are fixed, and a diaphragm forming the opposite base of the cylinder and constituted of a membrane soluble in the liquid to be detected or permeable thereto.

DETAILED DESCRIPTION

Figure 1:
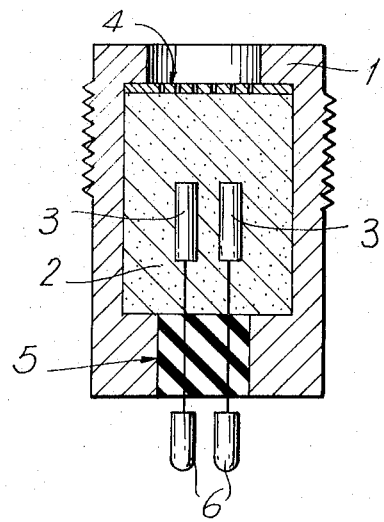
FIGS. 1, 2 and 3 illustrate in cross-section, three respective devices corresponding to the invention.

FIG. 1 illustrates a device for causing an electrical circuit to close by the deposit of a conducting substance between two electrodes, this deposit being produced by the reaction of a pyrotechnical composition 2 with a liquid whose presence is to be detected.

The device comprises a hollow cylindrical metal body 1 having a threaded portion for attachment to an enclosure in which the presence of the liquid is to be detected. The cylindrical body containing the pyrotechnical composition is closed at one end by an insulating wall 5, in which are fixed pin-type connectors 6 of an electrical circuit. The opposite end of cylindrical body 1 is closed by a membrane 4 which is soluble in or permeable to the liquid to be detected.

For example, if it is desired to detect the presence of water, the reaction of boron with silver difluoride may be used wherein:

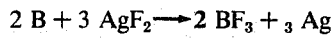

$$2 B + 3 AgF_2 \rightarrow 2 BF_3 + 3 Ag$$

this reaction being initiated by the exothermal hydrolysis of silver difluoride, which leads to the deposit of metallic silver and the release of gaseous $BF_3$.

Figure 2:
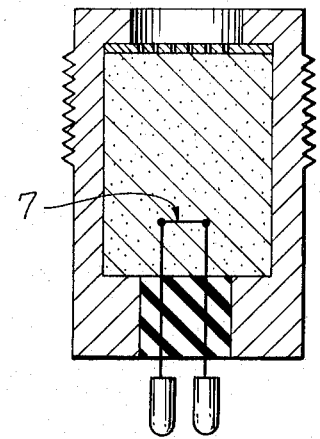

FIG. 2 diagrammatically illustrates a device used in the case where, conversely, it is desired that an electrical circuit be opened upon the presence of a liquid and therein a fusible wire 7 is destroyed by the heat of reaction of the pyrotechnical composition with the liquid to be detected.

In the case of the detection of the presence of water, the same reaction as above may be used with an additive increasing the resistivity of the deposit, or by replacing boron by a metal whose fluoride is not gaseous.

Figure 3:
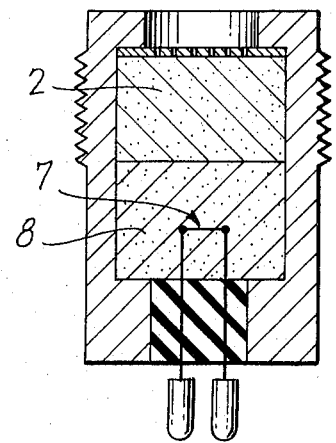

FIG. 3 represents a variant of FIG. 2, in which the melting of wire 7 is caused through the agency of a second pyrotechnical composition 8, giving higher resistivity after the reaction of the bodies.

It is possible to combine these different forms of application in order to obtain devices which ensure simultaneously the opening or closing of a number of circuits or, again, the opening of some and the closing of others.

In all cases, it is possible to produce a device of small size in compact form and whose utilization is similar to that of a fuse, namely it is easy to install and to replace.

The enclosure to be kept under surveillance needs only the slightest modification, i.e., a threaded hole, for example, for receiving the threaded portion of body 1.

The device with which this invention is concerned may be used in all cases where it is necessary to detect the accidental presence of a liquid in an enclosure, with a view to such presence being signalled or a safety control operated: the only condition is the existence of a pyrotechnical composition reacting in the presence of the liquid concerned. In the military field, the device and process have application with regard to the safety of certain circuits and containers fitted inside submarines; in the domestic field they have application for installations found in chemical plants, for detecting leaks in oceanographic diving equipment, and for monitoring hydraulic work and the behavior of dams.

What is claimed is:

1. A process for the prompt detection of the presence of a liquid comprising effecting a fast reaction (B) between two reagents which comprise a pyrotechnical composition, initiating reaction (B) by the thermal effects of a reaction (A) of one of said reagents with the liquid to be detected, and detecting the presence of the liquid by the detection of reaction (B) using electrical means to detect a change in the electrical resistivity within the composition.

2. A process as claimed in claim 1 wherein said reaction (B) produces an electrically conducting deposit in the zone situated between two electrodes serving as said electrical means and representing terminals of said electric circuit, thus causing closure of said circuit.

3. A process as claimed in claim 1 wherein the electrical means comprises a fusible conducting wire and the thermal effect of reaction (B) effects the melting of the wire, thereby causing the change in electrical resistivity.

4. A process as claimed in claim 1 wherein said pyrotechnical composition contains one metallic salt.

5. A process as claimed in claim 4 for the detection of the presence of water, wherein the pyrotechnical composition comprises silver difluoride and reaction (B) is the reaction of silver difluoride with boron, thus leading to the formation of a silver deposit and the release of boron trifluoride.

6. Apparatus for prompt detection of a liquid comprising
    a medium reacting to the presence of the liquid to be detected, said medium including a pyrotechnical composition, and
    a hollow body containing said medium and having a first insulating wall in which are fixed at least two electrically conducting elements and a second wall formed of a membrane which is capable of passing the liquid to be detected to said medium, the reaction of the medium and the liquid being effective to alter the zone between the conducting elements and change the electrical state of an electrical circuit containing the two conducting elements to indicate the presence of said liquid in said body.

7. Apparatus as claimed in claim 6 for the detection of the presence of water, said two electrically conducting elements being electrodes connected in circuit and fixed in said insulating wall, said medium consisting essentially of silver difluoride and boron, said medium producing, by reaction, a silver deposit in the zone situated between said two electrodes of the electrical circuit thus causing closure of said circuit.

8. Apparatus as claimed in claim 6 wherein said hollow body is cylindrical and comprises means for attaching the body to an enclosure in which the detection of the liquid is to be made, said first insulating wall being an insulating diaphram closing one end of the cylindrical body, said electrically conducting elements being two electrodes connected in electrical circuit and fixed in said diaphragm, said second wall being a diaphragm closing the opposite end of the cylindrical body and formed of a material which is soluble in the liquid to be detected or is permeable to this liquid.

* * * * *